United States Patent [19]
Drekter et al.

[11] 3,715,761
[45] Feb. 6, 1973

[54] SEDIMENTATION RATE TEST INSTRUMENT

[75] Inventors: Isaac J. Drekter, Queens Village, N.Y.; Frank R. Bradley, Bronx, N.Y.; Morton P. Matthew, Norwalk, Conn.; Paul Delaney, Bronx, N.Y.

[73] Assignee: Sedriter Corporation, New York, N.Y.

[22] Filed: Oct. 23, 1970

[21] Appl. No.: 83,513

[52] U.S. Cl............346/33 A, 250/218, 346/33 ME, 356/39
[51] Int. Cl............................................G01n 33/16
[58] Field of Search....346/33 A, 33 ME; 356/39, 40, 356/103, 108; 250/218; 73/290, 293, 61.4

[56] References Cited

UNITED STATES PATENTS

| | | |
|---|---|---|
| 2,091,303 | 8/1937 | Brelsford............................72/290 |
| 2,104,525 | 1/1938 | Proskouriakoff......................356/40 |
| 2,351,081 | 6/1944 | Swift..................................346/33 A |
| 2,419,487 | 4/1947 | Dresser..............................340/187 |
| 2,982,170 | 5/1961 | Wyss....................................356/39 |

Primary Examiner—Joseph W. Hartary
Attorney—Gottlieb, Rockman & Reisman

[57] ABSTRACT

An instrument for automatically recording the falling sedimentation level during an hour-long blood sedimentation rate test. An assembly including a lamp and photo-detector tracks the falling sedimentation level and drops down vertically together with the serum-red cell interface. The falling assembly includes a pen. The assembly drops in equal increments and prior to each drop the pen is brought to bear against a strip of paper which moves at a constant rate past it. The resulting trace is a series of closely spaced dots, the vertical axis of which represents the serum-red cell interface and the horizontal axis of which represents time. The hour-long test can be run unattended, and the unit shuts off automatically.

25 Claims, 11 Drawing Figures

INVENTORS
ISAAC J. DREKTER
FRANK R. BRADLEY
MORTON P. MATTHEW
PAUL DELANEY

BY Amster & Rothstein
ATTORNEYS

INVENTORS
ISAAC J. DREKTER
FRANK R. BRADLEY
MORTON P. MATTHEW
PAUL DELANEY

BY Amster & Rothstein
ATTORNEYS

FIG. 11.

SEDIMENTATION RATE TEST INSTRUMENT

This invention relates to sedimentation rate test instruments, and more particularly to such an instrument for automatically providing a visible trace during the entire sedimentation rate test.

The sedimentation rate test is generally carried out by combining a sample of a patient's blood with an anticoagulant agent and filling a graduated tube with it. With the tube held in a vertical position, the blood gradually separates; the clear serum remains on top and the red blood corpuscles fall to the bottom of the tube. The technique currently used involves reading the distance from the surface of the clear serum to the serum-red cell interface exactly one hour after the start of the test.

The present-day test is conducted manually. The lab technician or operator must first fill a tube to an exact level, place it in a rack, and return in one hour to read the level of the interface. There are numerous disadvantages with this approach. Not only is there a possibility of a reading mistake, but it has been found that serious errors arise in those cases where a busy lab technician does not return in exactly one hour to take the reading. Also, it has been found that samples which arrive late in the day are generally refrigerated overnight, and the delay in performing any test necessarily affects the validity of the result.

But by far the most serious shortcoming of the present-day technique is that it is basically an "endpoint only" test. It has been suggested that the falling interface during the entire one-hour test period can furnish a considerable amount of information. However, due to the difficulty and expense of taking continuous readings on the graduated tube, in almost all cases where the test is performed only the end point is determined, that is, how far the interface fell within 1 hour.

It is a general object of our invention to provide an instrument which makes a permanent record of the sedimentation (interface) level as a function of time during the entire sedimentation rate test, and which requires no supervision except at the start of the sequence.

Briefly, in accordance with the principles of our invention, we provide a vertically-traveling assembly which moves along the sample tube. The assembly includes a lamp which is pulsed periodically and a photo-detector disposed on opposite sides of the tube. The assembly is initially at the top of the tube. As long as the serum-red cell interface is above the lamp and photo-detector, the light transmitted from the lamp through the tube to the photo-detector is insufficient for triggering any action. However, if the sedimentation level has fallen below the lamp and photo-detector, the light which is transmitted through the clear serum energizes the photo-detector which in turn actuates a solenoid.

The vertically-traveling assembly includes a pen. A strip of paper moves around a vertical roller in the vicinity of the pen. Each time the solenoid is energized, the pen momentarily strikes the paper. Immediately thereafter, the vertically-traveling assembly (including the pen) drops one-quarter millimeter. The lamp is energized at a frequency high enough such that as a practical matter the pen follows the sedimentation level with no delay. As soon as the sedimentation level falls below the level of the lamp and photo-detector, the next lamp energization causes the pen to strike the paper and to then drop one increment. Typically, the drop will be sufficient to prevent further energization of the solenoid during subsequent energizations of the lamp for many seconds. Eventually, however, the sedimentation level falls another one-quarter millimeter, at which time the pen once again strikes the paper and then similarly drops one-quarter millimeter.

The strip of paper moves at a constant rate in the horizontal direction. The dots formed on the paper as a result of the engagements of the pen with the paper form a curve, the vertical coordinate of which represents the sedimentation level and the horizontal coordinate of which represents time. There is thus available not only the end point, but a permanent record of the sedimentation level at all times during the running of the test.

The instrument includes a start button which when depressed by an attendant, after the sample is put into place, starts the automatic running of the test. The unit shuts itself off automatically after one hour has elapsed. As long as the sample level is below the initial position of the lamp and photo-detector, at the beginning of the run each time the lamp is energized the solenoid will operate, and the pen, lamp and photo-detector will fall one increment. The entire assembly rapidly falls until the lamp and photo-detector are just below the level of the serum-red cell interface. Thereafter, the assembly falls only periodically as it tracks the falling level.

The assembly falls under the force of gravity. As will be described below, each time the solenoid operates a threaded shaft turns 90°. The vertically-traveling assembly includes a thread follower which follows the thread of the shaft due to the weight of the assembly itself. This gravity-controlled tracking eliminates the need for otherwise complex and costly tracking mechanisms.

Furthermore, each time the solenoid is energized the threaded shaft turns the same amount. This in turn causes the vertically-traveling assembly to drop by the same amount each time a step is taken. To determine the sedimentation rate (ratio of interface movement to time) over any time interval of interest, all that is required is to count the number of dots on the paper trace within the time period of interest. Since each dot represents a one-quarter millimeter drop, the numerator of the rate ratio can be determined simply by counting dots rather than taking an analog measurement. This digitized operation is also advantageous in that it facilitates digital data processing of the test data. If the data is to be automatically processed, it is necessary to derive an electrical representation of the falling sedimentation level. Since each solenoid actuation represents a constant drop in the level, the total drop can be determined simply by counting electronically the number of times that the solenoid has been actuated during any interval of interest. It is not necessary to provide analog circuits for this purpose. Although the illustrative embodiment of the invention does not include such an automatic data processing capability, it is to be understood that the fixed incremental drops of the level-tracking assembly facilitate such processing if it is desired.

Another advantage of forming equal vertically-spaced dots on the trace is that it makes it easier to observe when the falling rate suddenly started to increase appreciably, something which may be of considerable interest.

It is a feature of our invention to provide a lamp and photo-detector assembly for vertically tracking the serum-red cell interface during the running of a sedimentation rate test.

It is another feature of our invention to provide a pen, as part of the lamp and photo-detector assembly, for recording the sedimentation level throughout the test.

It is another feature of our invention to cause the lamp, photo-detector, and pen assembly to track the sedimentation level in fixed incremental drops.

It is another feature of our invention to mount the lamp, photo-detector and pen assembly such that it is caused to fall vertically, when necessary, by the force of gravity.

It is another feature of our invention to cause the pen to write a dot on a paper strip each time it falls one increment, the resulting trace being a series of closely-spaced dots rather than a continuous curve.

It is still another feature of our invention to provide a timing circuit for automatically controlling a one-hour test, following initial actuation by an attendant.

Further objects, features and advantages of our invention will become apparent upon consideration of the following detailed description in conjunction with the drawing, in which.

It is generally recognized that there are three phases which are passed through during the "sedimentation" process — agglutination, sedimentation and settling. The information obtained from the sedimentation rate test as it is practiced today includes all three phases since no readings are taken other than a single reading at the end of the hour. But the sedimentation rate throughout the test period has been suggested to be of considerable interest. However, it is possible that the rate of fall of the serum-red cell interface at the beginning of the test has a correlation with blood sludging. Also, most authorities consider the middle as representing the "true sedimentation rate" and suggest correction for the other phases. Such considerations make it highly desirable to provide a graphical trace of the sedimentation level as a function of time for the entire test sequence.

The literature on the sedimentation rate test is too vast for summary. It is not necessary for an understanding of the present invention to comprehend all of the information available from the graphical traces achieved with the use of our invention. However, it will facilitate an understanding of the invention to briefly examine some typical traces recorded during actual tests.

Figure 10:
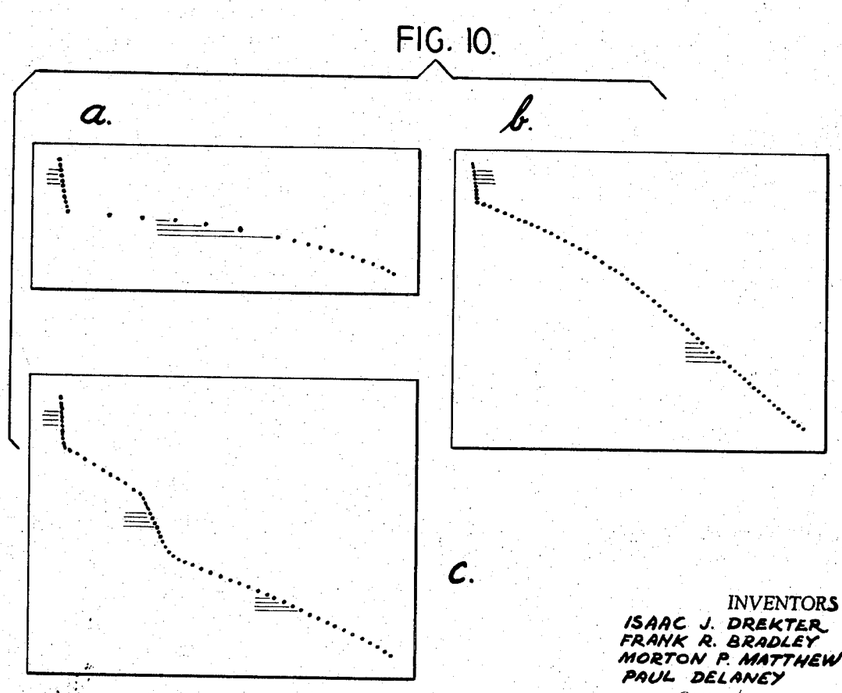
FIGS. 10a – 10c depict three illustrative traces made with the instrument illustrated in the drawing on blood samples of three different patients.

FIG. 10 shows three test results. Curve a is typical of those obtained with normal samples. (The vertical segment at the left end of the curve represents the rapid dropping of the lamp and photo-detector assembly to the sample level at the start of the test as described above, and does not represent any useful information. The sedimentation rate exhibited by curve a is sufficiently low for the sample to be considered normal. Curve b on the other hand, exhibits a higher rate and, depending on other symptoms, provides much useful information to the physician about the patient tested. Curve c is of considerable interest because it shows a serious shortcoming of the conventional "end point only" technique. The sedimentation rate, as measured between the starting and end points, shows a rate somewhere between those for curves a and b. However, curve c exhibits a very fast sedimentation rate in a short region (around 20 minutes after the test started). If only the end point is read, the physician will not be informed that a fast drop — an indication of some serious deficiency — took place at some time during the hour-long test. It is apparent that a graphical presentation of the fall of the serum-red cell interface during the entire course of the test can be of invaluable aid in many cases.

Before proceeding with a description of the illustrative embodiment of the invention, it should be noted that the dots forming each of curves a–c are equally spaced in the vertical direction. Although each dot is in practice one-quarter millimeter below the dot immediately above it, no matter how far apart the two dots are along the horizontal (time) coordinate, in the drawing the dots are shown two millimeters apart for the sake of clarity, i.e., only every eighth dot is shown. The dots are evenly spaced along the vertical coordinate due to the fact that the paper moves at a constant rate throughout the test, while the pen drops in one-quarter millimeter increments only as fast as the serum-red cell interface falls in the same increments. To determine the total fall in the level during any interval of time, all that is required is to count the total number of dots in this interval and to multiply this number by one-quarter millimeter.

Figure 1:
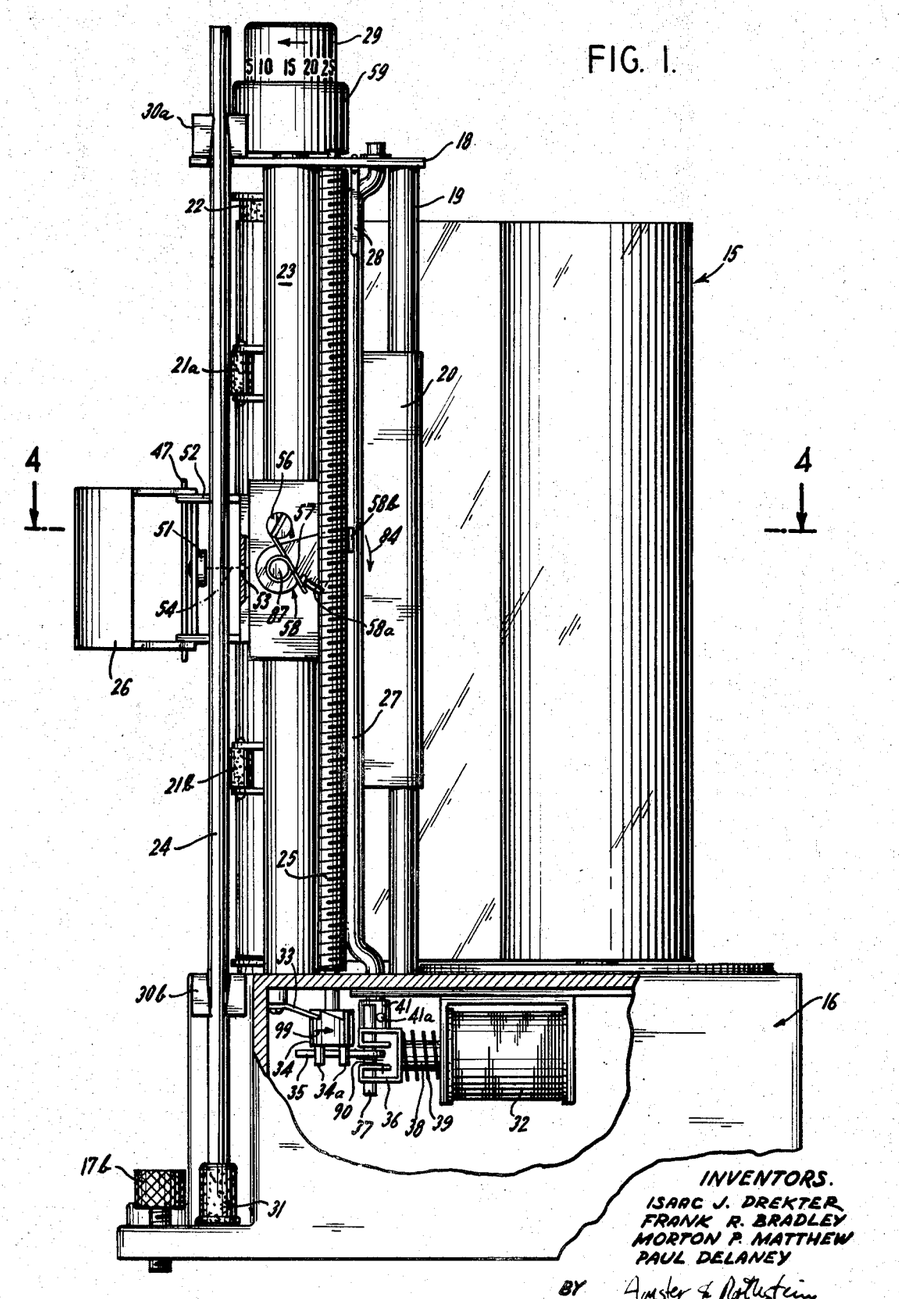
FIG. 1 is a front view, shown partly broken away, of the illustrative embodiment of our invention.
Figure 2:
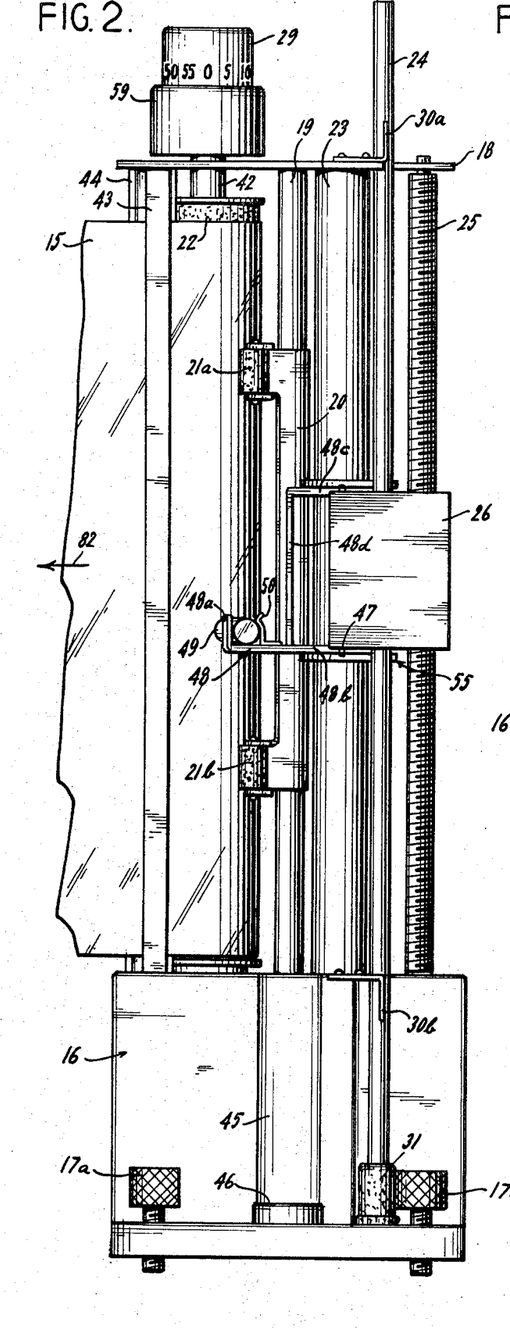
FIG. 2 is a side view of the instrument of FIG. 1.
Figure 4:
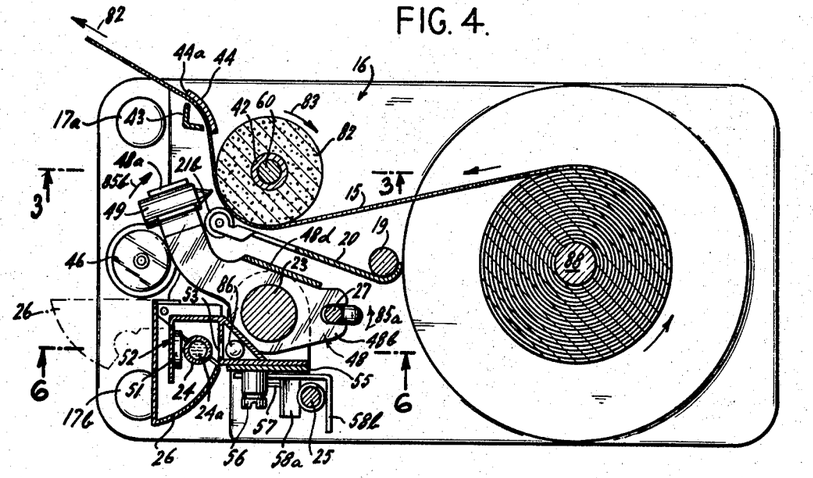
FIG. 4 is a sectional view taken through line 4-4 of FIG. 1.

The arrangement of the various shafts and other vertical elements mounted on base 16 is best understood with reference to FIGS. 1, 2 and 4. Stationary shaft 23 extends upward from base 16 and is attached at its upper end to plate 18. The shaft serves as a guide for the vertically-traveling assembly (elements 26, 48, 52 and 55). The elements in the assembly are capable of rotational movement with respect to each other, but move downward together in the axial direction along shaft 23.

Also extended between base 16 and plate 18 is a shaft 42 which carries rubber roller 22. The roller assembly, seen most clearly in FIG. 3, will be discussed in detail below. Spindle 88 (FIG. 4) extends upward from base 16 and serves to orient paper roll 15 on the base. As seen most clearly in FIG. 4, the leading edge of the paper roll is wrapped around rubber roller 22 and is then passed between vertical guides 43, 44. Edge 44a of guide 44 serves as a knife to cut the paper after a trace is formed on it. Shaft 19, which also extends between base 16 and plate 18, carries leaf spring 20, which terminates in two pressure rollers 21a, 21b. The leaf spring is naturally biased such that the two pressure rollers bear against the paper wrapped around roller 22. The pressure of the spring is sufficient to cause the paper to be fed from the supply roll as rubber roller 22 rotates in the direction shown by arrow 83 in FIG. 4.

Threaded shaft 25 also extends between base 16 and plate 18. The shaft extends through the base, as seen most clearly in FIG. 1, and terminates in drive element 34. Each time solenoid 32 is operated, drive element 34 and shaft 25 turn 90 degrees. As will be described below, this in turn causes the vertically-traveling unit, including pen 49 and elements 26, 48, 52 and 55 to fall down one step (one-quarter millimeter). At the same time, the pen bears against the paper, wrapped around roller 22, to cause another dot to be formed in the trace.

Figure 5:
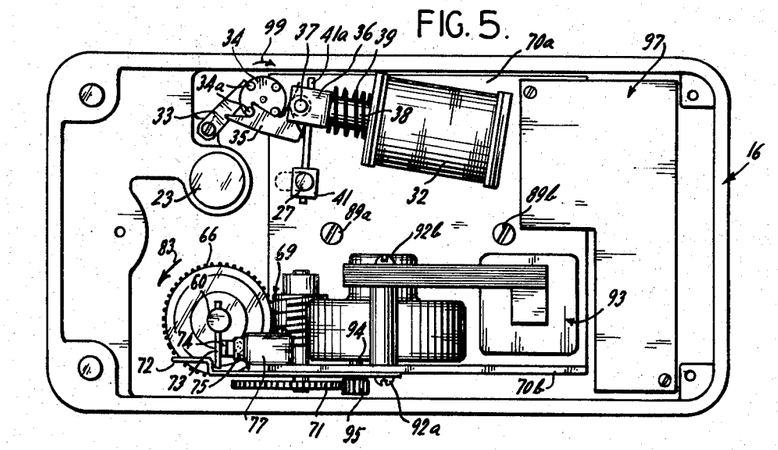
FIG. 5 is a view from below the instrument of FIG. 1 (with a bottom cover plate now shown)

Shaft 27, extended between base 16 and plate 18, has upper and lower ends which are bent. While the upper end of the shaft simply terminates in a bearing provided in plate 18, the lower end terminates in connecting block 41 (see FIG. 5). Pin 41a extends out of block 41 in a horizontal plane. Referring to FIG. 1, leaf spring 28, mounted to plate 18, is provided to bias shaft 27 to the position shown. When solenoid 32 is operated, as will be described below, pin 37 is first pulled to the right (in FIG. 5) and then returned to its normal position as shown. When solenoid 32 is first operated, pin 37 bears against pin 41a and causes a shaft 27 to turn slightly in the counter-clockwise direction of FIG. 4, as shown by arrow 85a. As will be described below, the slight turning of shaft 27 in the counter-clockwise direction causes pen holder 48 to rotate in the clockwise direction as shown by arrow 85b. It is at this time that pen 49 strikes paper 15. As soon as the solenoid releases, pin 37 returns to its normal position as shown in FIGS. 1 and 5, and leaf spring 28 causes shaft 27 to similarly return to its normal position, thereby returning pen holder 48 and pen 49 to their normal positions as shown most clearly in FIG. 4.

Also extended between base 16 and plate 18 is glass tube 24. The upper end of the tube is held in clip 30a attached to the top of plate 18. Clip 30b, attached to base 16, also serves to hold the tube in place. The tube terminates at its lower end in rubber stopper 31, which sits on an extension at the bottom of the base. It is important for the glass tube 24, which contains the blood sample to be processed, to remain in a vertical orientation; the sedimentation rate can be affected by an off-vertical orientation of the sample. To insure that the glass tube is vertical, leveling screws 17a, 17b are provided at the bottom of the base section, together with a conventional level indicator 46. The leveling screws are adjusted until the level indicator shows that the glass tube is vertical.

During the performance of any test, rubber roller 22 rotates at fixed rate, making one complete turn in 60 minutes. Pen 49 is normally disposed away from paper 15, wrapped around the drive roller. Each time threaded shaft 25 makes one-quarter turn, pen 49 is lowered one step, after first momentarily striking the paper. Each quarter-turn of shaft 25 causes the pen (and the entire vertically-traveling assembly) to drop one incremental step. The pitch of the thread on shaft 25 is such that the vertical distance between successive dots formed on the paper is one-quarter millimeter. In effect, the pen follows the sedimentation level as it drops. The time base of the resulting trace is determined by the speed of roller 22 which is constant. Consequently, the resulting trace (a dotted curve) is a plot of the sedimentation level versus time.

Element 55 is simply a U-shaped bracket having a hole in each leg. The bracket is mounted on stationary shaft 23 for vertical movement (see FIGS. 1,2,4 and 6). On the outside surface of the central portion of the bracket is a screw 56 and an extending pivot pin 87 below it. Mounted on the pivot pin is element 58 having a bent section 58b for bearing flat against threaded shaft 25, and an inclined similarly bent section 58a the edge of which serves to track the thread in the shaft. Spring 57 is mounted on pivot pin 87, and has one end attached to screw 56 and the other end attached to bent section 58a. The spring serves to bias element 58 in the counter-clockwise direction of FIG. 1. Prior to the start of any test, bracket 55 is simply forced upward to the top of shaft 23. Thread follower 58a is pushed in and out of the thread on shaft 25 as the entire assembly is moved upward. (Alternatively, instead of simply pushing bracket 55 upward with the concomittant "clicking" noise as follower 58a is forced out of the thread and then forced back in by the action of the spring, element 58 can be rotated slightly in the clockwise direction as shown by arrow 84 in FIG. 1 to disengage follower 58a from the shaft thread. While the element is held rotated slightly in this manner, the assembly can be raised without the element rocking back and forth.) Once the assembly is moved to the uppermost position, the spring biases element 58 in the counter-clockwise direction and thread follower 58a remains in the thread of shaft 25. This prevents downward movement of the assembly. Each time shaft 25 is rotated 90 degrees in the direction shown by arrow 99 in FIG. 1, follower 58a follows the thread of the shaft and bracket 55 takes an incremental step downward.

Bracket 52, seen most clearly in FIG. 4, is mounted to the interior portion of the central section of bracket 55. Bracket 52 carries lamp 86 and photo-detector 51. The bracket includes a U-shaped section which fits around glass tube 24, in which blood sample 24a is contained. Light from lamp 85 is transmitted through hole 53 in the bracket and through the glass tube to photo-detector 51. The lamp is shielded by plate 87; the only exit for the light is through hole 53. (The hole should be long enough in the vertical direction, e.g., 2 mm, to insure sufficient light transmission through the sample serum to energize photo-detector 51. The hole should also be narrow enough e.g., 1 mm, compared to a 3-mm internal diameter of the glass tube, so that slight misalignments do not affect the operation.)

At the rear of bracket 52 is a pin 47 which serves to mount light shield 26 to the bracket. The light shield, in its closed position, prevents light other than that from lamp 86 from striking photo-detector 51. The light shield completely encloses glass tube 24. In order to remove the tube or to put it in place, the light shield is moved to its open position, as shown by dotted lines 26' in FIG. 4. After insertion of a tube in the apparatus, the light shield is closed.

Pen holder 48 includes a vertical section 48d and two horizontal sections, 48b and 48c. Each of the horizontal sections includes a hole so that the entire unit can be mounted on shaft 23. Sections 48b, 48c are carried on shaft 23, within the two legs of bracket 55. The pen holder is thus mounted for free movement on shaft 23, but is moved up and down along with bracket 55. The lower horizontal section 48b of the pen holder, seen most clearly in FIG. 4, holds pen 49 in its tip. The pen, typically a wax cartridge, is held in place by spring clip 50 mounted on the pen holder, as seen most clearly in FIG. 2. The opposite end of horizontal section 48b includes a notch into which shaft 27 is fitted, as seen most clearly in FIG. 4. It is apparent that if shaft 27 is rotated counter-clockwise, as shown by arrow 85a in FIG. 4, pen holder 48 is rotated in the clockwise direction around shaft 23, as shown by arrow 85b. Whenever shaft 27 is thus rotated, pen 49 bears against paper 15 to form another dot on the trace. As soon as the moving force of shaft 27 is removed, the shaft returns to its normal position under the influence of leaf spring 28 (see FIG. 1) and pen 49 is displaced away from the paper in its normal position as shown in FIG. 4. Each time solenoid 32 is operated, shaft 27 first rotates in the direction of arrow 85a (FIG. 4) to cause another dot to be formed on the trace. When the solenoid is released, the pen springs away from the paper and at the same time shaft 25 turns 90° and the entire vertically-traveling assembly takes another step downward.

Figure 6:
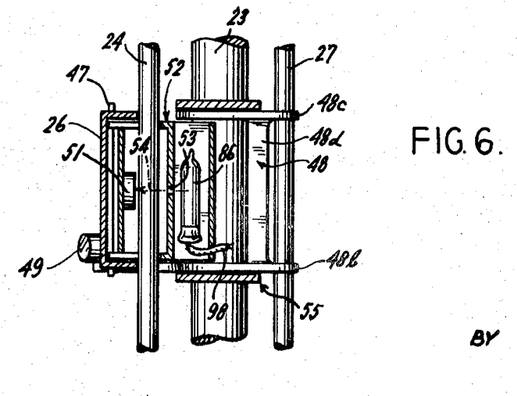
FIG. 6 is a sectional view taken through line 6-6 of FIG. 4.

Wire pair 98, shown in FIG. 6, is extended from lamp 86 to the electronic circuit to be described below. A similar pair of wires is provided for photo-detector 51, although such wires are not shown in FIG. 6 for the sake of clarity.

The lamp is energized periodically, at a rate of several times per minute. As long as the sedimentation level is above the photo-detector, an insufficient amount of light is transmitted through tube 24 and the red blood cells to the photo-detector for a triggering pulse to be generated. However, as soon as the sedimentation level has fallen below the photo-detector, the light transmitted through the clear (serum) portion of the sample energizes the photo-detector and a triggering pulse is generated. This pulse results in the energization of solenoid 32 which in turn first causes another dot to be formed in the trace, following which the entire vertically-traveling assembly is lowered one increment. The timing of the energization of lamp 86 is not critical — the lamp is energized so frequently relative to the falling red blood cell level that for all intents and purposes the photo-detector tracks the level with an immeasurable delay. Of course, as the photo-detector tracks the falling level, so does the pen since all elements in the vertically-traveling assembly move together.

The effect of the energization of solenoid 32 on the vertically-traveling assembly can be understood most clearly with reference to FIGS. 1 and 5. Bracket 36 is mounted to the shaft of the solenoid, which shaft is biased to the left in each of FIGS. 1 and 5 by the action of spring 39. The solenoid itself is mounted on L-shaped bracket 70, having a horizontal leg 70a mounted to the underside of the upper part of base 16 by screws 89a, 89b, and a vertical leg 70b on which timing motor 93 is mounted. Bracket 36 carries pin 37 on which actuator 35 is mounted for pivotal movement. Spring 90 is provided to bias the actuator toward threaded shaft 35 (in the upward direction in FIG. 5.) At the lower end of shaft 25 there is provided a cylindrical drive element 34 which includes four depending legs 34a. A leaf spring 33 is mounted to the underside of base 16 such that it bears against the teeth in the upper part of element 34. This arrangement prevents rotation of shaft 25 in the clockwise direction seen from above the apparatus. The shaft can only turn in the counter-clockwise direction, as shown by arrow 99 in FIGS. 1 and 5.

When the solenoid is first actuated, its shaft is drawn back and bracket 36 moves to the right in both of FIGS. 1 and 5. During the initial movement of the bracket, pin 37 which is carried in it bears against pin 41a and, as seen most clearly in FIG. 5, causes shaft 27 to rotate in the clockwise direction. This results in the rotation of the shaft against the force of leaf spring 28 (FIG. 1) which in turn causes pen holder 48 to rotate and cause another dot to be applied to the paper trace. While the solenoid shaft is pulled into the coil, actuator 35 has no effect on drive element 34. Referring to FIG. 5, it is seen that as actuator 35 moves to the right, it simply rotates slightly in the counter-clockwise direction around pin 37. Surface 35a is forced downward by the lowermost right one of pins 34a shown in the drawing. At the end of the movement of the solenoid shaft to the right, however, the tip of edge 35a clears that one of pins 34a which forced it down to begin with. At this time, actuator 35 springs back under the influence of spring 90. The lowermost right one of pins 41a now fits in the forward notch of actuator 35.

When the solenoid releases, spring 39 forces the solenoid shaft and bracket 36 to move to the left. Actuator 35 is forced to the left and returns to the position shown in FIG. 5. In so returning, it causes drive element 34 (and threaded shaft 25) to turn 90° in the direction shown by arrow 99. The turning of shaft 25 in turn causes the vertically-traveling assembly to drop one-quarter millimeter. While the assembly thus drops, it should be noted that pen 49 does not bear against the paper. At the start of the return of the solenoid shaft, leaf spring 28 causes shaft 27 to return to its initial position since pin 37 no longer holds pin 41a out of its normal position. The pen is lifted from the paper just prior to its lowering by one increment.

FIG. 5 also shows a plate 97 mounted to the underside of base 16. Although not shown in the drawing, the electronic circuit for controlling the operation of the apparatus is mounted on this plate. The electronic circuit itself will be described below with reference to FIG. 11.

Timing motor 93 is mounted to plate leg 70b as shown in FIG. 5, the timing motor being held in place by two screws 92a and 92b screwed into shaft 91. The timing motor drives shaft 94 which in turn causes gear 95 to rotate. This gear is coupled to gear 71, which in turn is coupled to worm gear 69. Gear 69 engages gear 66. It is this latter gear which drives roller 22, the roller making one complete rotation in 60 minutes. The entire sequence begins when button 29 at the top of the roller is pressed down. A switch assembly is provided to automatically turn off the unit after one hour has elapsed.

Figure 3:
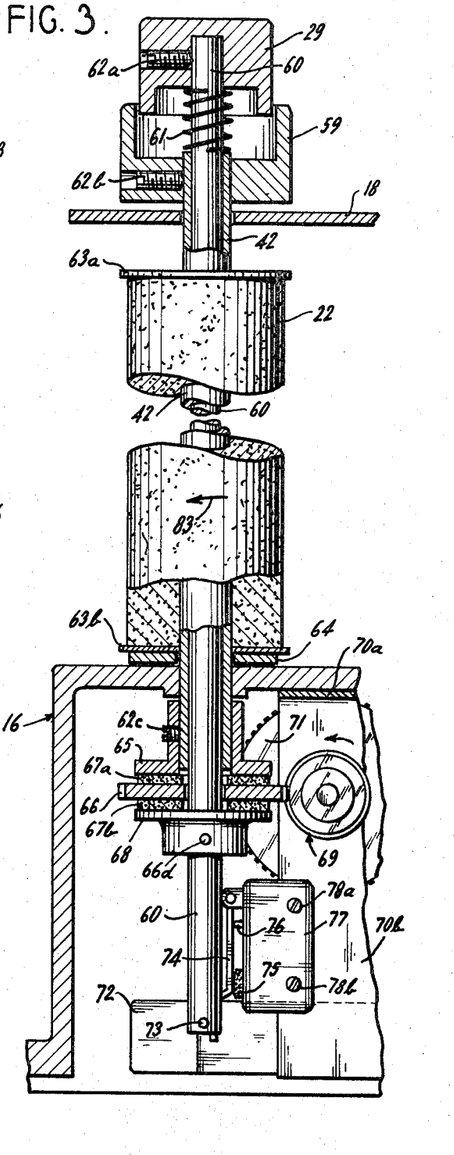
FIG. 3 is a partial sectional view taken through line 3—3 of FIG. 4 and illustrates the various elements associated with rubber roller 22.

Referring to FIG. 3, shaft 60 extends through plate 18 and into base 16. Around shaft 60 there is a cylindrical shaft 42 which can rotate independently of shaft 60. It is this latter shaft which supports rubber roller 22 (and upper and lower paper guides 63a, 63b). At the upper end of the shaft assembly, there is mounted a cylindrical housing 59, attached to shaft 42 by screw 62b. At the upper end of shaft 60 is another cylindrical housing (button) 29, attached by screw 62a. Spring 61 is mounted on shaft 60 between button 29 and the upper part of shaft 42. Housing 59 simply serves to shield spring 61 from view. When button 29 is pushed down, it forces shaft 60 to move down with it. When the button is released, it and the shaft are forced upward by the action of spring 61. Shaft 42 does not move in the axial direction. Washer 64 is provided underneath paper guide 63b on top of base 16 for supporting shaft 42. Shaft 42 is capable of rotational movement only.

Collar 65 is mounted to shaft 42 by screw 62c. Collar 68 is mounted to shaft 60 by screw 62d. Gear 66, mounted on shaft 60 and driven by worm gear 69, is provided with two friction disc 67a, 67b on either side of it. Disc 67a makes contact with collar 65 so that the rotation of gear 66 causes shaft 42 and roller 22 to move with it. When button 29 is released and shaft 60 is forced upward by the action of spring 61, collar 68 bears against friction disc 67b. In such a case, the rotation of gear 66 also causes shaft 60 to rotate, and button 29 as well.

When shaft 60 is pushed down at the start of any test, gear 66 actually drops slightly since its sole support is collar 68. However, the downward movement is too short to disengage gears 66 and 69. As soon as shaft 60 and collar 68 spring upward with the release of button 29, gear 66 serves to frictionally drive both collar 65 and collar 68.

Time markings, in 5-minute intervals, are provided on button 29 as shown in FIG. 2. Once the unit is running, the turning of gear 66 (once in 60 minutes) causes both shaft 60 and the rubber roller to rotate. At the bottom of shaft 60 is an extending pin 73 (see FIG. 5). It is this pin which controls microswitch 77 to shut off the unit after each hour test. It is also this pin which insures that at the start of each test button 29 is positioned with its zero marking above a predetermined reference line (on plate 18), not shown on the drawing. It is this reference line which enables the operator to at any time determine how far the test being performed has progressed, simply by observing the time marking above the line.

Figure 7:
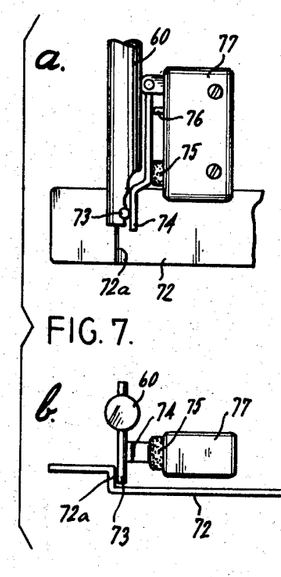
FIGS. 7a, 7b, 8a, 8b, 9a and 9b depict the position of shaft 60 relative to microswitch 77 and leaf spring 72 at three different points during each test sequence.
Figure 8:
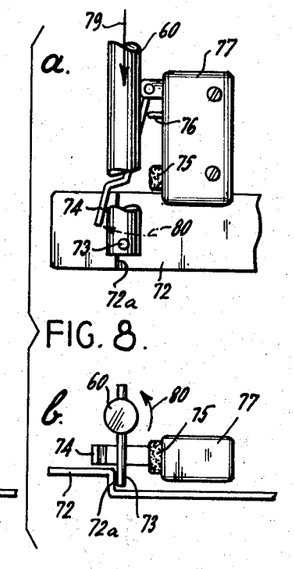
Figure 9:
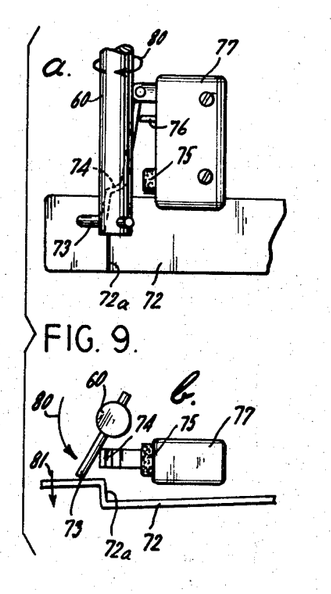

Microswitch 77 is mounted on plate 70b as is leaf spring 72. The cooperation of pin 73, shaft 60, spring 72 and the microswitch can be understood most clearly with reference to FIGS. 7, 8 and 9 which show the rotational position of shaft 60 during three different portions of each cycle. Each of FIGS. 7, 8 and 9 shows both a side view similar to that of FIG. 3, and a corresponding bottom view. The position of shaft 60 in FIG. 7 is the same as that shown in FIG. 3.

Initially, as shown in FIG. 7, shaft 60 is in a position such that pin 73 forces microswitch finger 74 in toward the switch. This in turn depresses button 76 on the switch which as will be described below shuts off power to the timing motor. Finger 74 bears against stop 75 at this time. It should also be noted that pin 73 is "trapped" between the depending end of finger 74 and the ridge in leaf spring 72. The shaft cannot be rotated by hand (by turning button 29) in either direction, since in one case it is blocked by finger 74 and in the other case it is blocked by the ridge in the leaf spring.

FIG. 8 shows what takes place when button 29 is pressed downward. At this time shaft 60 moves downward as shown by arrow 79. Pin 73 clears finger 74, at which time the finger springs outward from microswitch 77 under the force of spring-loaded button 76. The motor energizing circuit is closed and the drive of gear 66 begins. As soon as button 29 is released, shaft 60 springs upward and collar 68 forces gear 66 upward (see FIG. 3). Shaft 60 and button 29 rotate together with rubber roller 22. Shaft 60 rotates in the direction of arrow 80 on FIG. 8b. Eventually, shaft 60 nears the completion of its rotation and pin 73 moves to the position shown in FIG. 9. At this time the pin bears against leaf spring 72 and forces it in the direction of arrow 81. Shaft 60 continues to rotate until pin 73 clears the ridge in spring 72 and the spring moves back into place. At the same time, pin 73 bears against finger 74 to turn off the motor, and shaft 60 remains in the position shown in FIG. 7.

The arrangement of the various elements in this manner insures that every test begins with the zero mark on button 29 being adjacent to the reference mark on top of plate 18. Even if the main power switch for the unit is turned off during the course of a cycle, the operator, at the start of the next test, can initiate the operation without having to worry about the proper alignment of button 29. The button is simply rotated in the forward direction of arrow 80 (FIG. 9) until it can be turned no more. At this time, the button is properly aligned and pin 73 is automatically placed at the starting point in each rotation. To start the machine all that is required is for the operator to press and release button 29. The timing motor runs for one hour and then shuts off automatically. A further advantage of the use of leaf spring 72 is that it prevents the operator from turning shaft 60 (button 29) in the reverse direction past the position shown in FIG. 7. Were the operator to turn shaft 60 in a direction opposite to that of arrow 80 in FIGS. 8 and 9, it would be possible for pin 73 to strike against the inner face of finger 74 and to break the microswitch by forcing the finger out away from the microswitch past its normal off position. This is not possible with the use of leaf spring 72 because pin 73 engages the ridge in the leaf spring to block movement of shaft 60 in the reverse direction past the position shown in FIG. 7.

Figure 11:
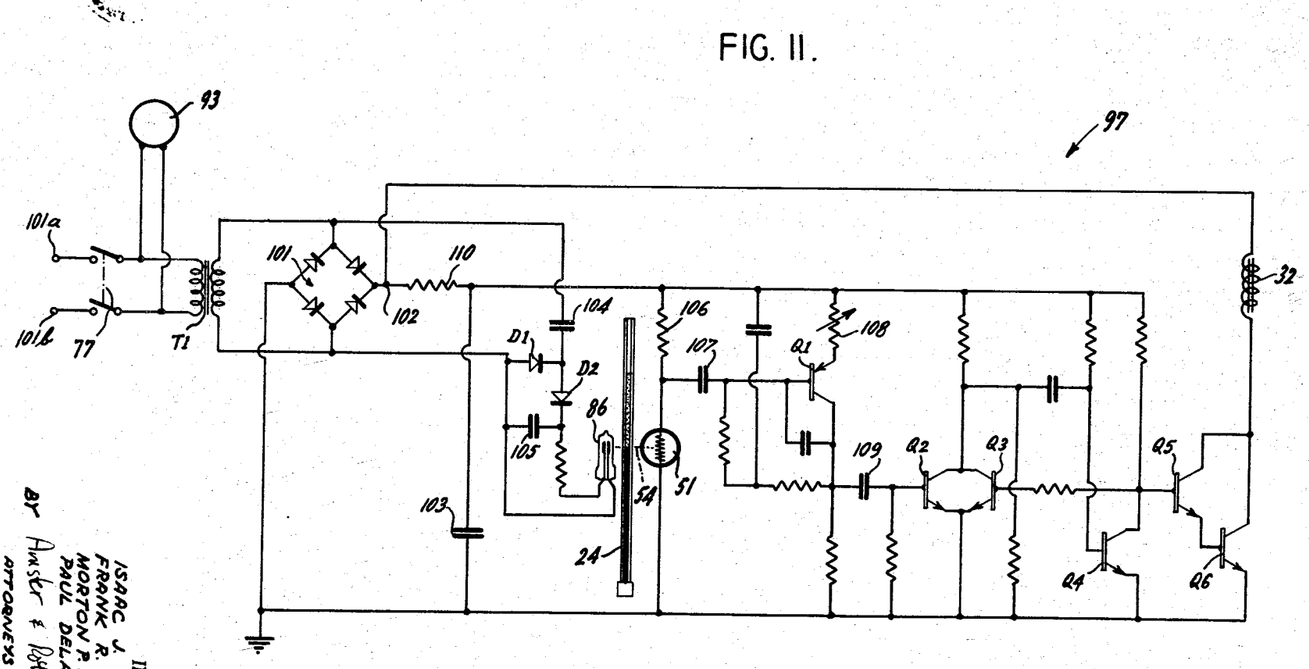
FIG. 11 is a schematic representation of the circuit which controls the cycling of the instrument.

The electronic circuit for controlling the machine operation is shown in FIG. 11. The circuit is identified by the numeral 97 to indicate that for the most part it is contained on circuit board 97 of FIG. 5. Wires are extended throughout the machine to interconnect those circuit elements not included on board 97. These circuit elements include motor 93, the contacts controlled by microswitch 77, lamp 86, photo-detector 51 and solenoid 32.

Terminals 101a, 101b serve to connect the line through microswitch 77 both to the terminals of timing motor 93 and the primary winding of transformer T1. When the microswitch contacts close at the start of each cycle the motor runs for 1 hour. At the end of each test, when the microswitch contacts open, the motor turns off. The microswitch contacts also serve to cut off power to the rest of the circuit at the end of each test. In this manner, it is not necessary to provide an external on-off power switch. All that is required to start the machine is to push down on button 29.

The secondary winding of transformer T1 is connected across full-wave rectifier 101. One of the output terminals of the rectifier is grounded and a pulsating positive potential is derived at the output terminal 102 of the rectifier. This potential is extended to one end of the winding of solenoid 32 and serves to energize the solenoid when transistors Q5 and Q6 conduct. The potential at terminal 102 is also extended through resistor 110 to capacitor 103. The capacitor serves to smooth the rectified voltage waveform to derive a DC potential suitable for biasing transistors Q1 - Q4.

A diode pumping circuit consisting of diodes D1, D2 and capacitors 104, 105 is used to periodically turn on glow discharge tube 86. The diode pumping circuit is connected directly across the secondary winding of transformer T1. During the first half cycle of the output of the transformer, current flows through diode D1 and capacitor 104 to charge the capacitor to the peak output of the transformer. During the next half cycle, diode D1 is reverse biased. Current now flows from the top of the transformer secondary through capacitor 104, diode D2 and capacitor 105 back to the secondary winding. The charge initially stored on capacitor 104 is partially transferred to capacitor 105. There is thus an incremental step increase in the voltage across capacitor 105. The charge on capacitor 105 gradually increases in steps until it exceeds the discharge potential of glow discharge tube 86. At this time, the tube conducts and emits a flash of light. Capacitor 105 discharges through the tube and the tube then turns off. The entire sequence then starts once again, with the voltage across capacitor 105 gradually increasing in steps to the point at which the tube is fired.

The time required for the capacitor to charge to the firing level depends on the ratio of the magnitudes of capacitors 104 and 105. The time interval between flashes of light is not critical. Considering that it takes up to one hour for the serum-red cell interface level to fall from the top of tube 24 to its lowermost level, it is apparent that it is not necessary to enable pen 49 to strike the paper and fall down one step more often than several times a minute. The exact number is not important; in the illustrative embodiment of the invention lamp 86 flashes at a rate of 10 times per minute.

The light 54 emitted from the lamp is directed to tube 24 but is blocked by the red cells in the tube as long as the light level is below the level of the serum-red cell interface. As soon as the interface level falls below the light level, the next light flash results in a momentary decrease in the impedance of photo-detector 51.

When the impedance of the photo-detector drops, the voltage at the junction of resistor 106 and the photo-detector drops momentarily. The drop in potential is AC-coupled through capacitor 109 to the base of transistor Q2. Potentiometer 108 functions as a gain control and is initially adjusted at the time of manufacture. (Most of the elements on FIG. 11 are not labeled nor are they discussed herein. These elements serve primarily to establish DC bias conditions and also to stabilize the circuit. Their functions will be apparent to those skilled in the art, and it is to be further understood that there are numerous circuits which can be designed to provide the same functions as those provided by the circuit of FIG. 11.)

Transistors Q3 and Q4 comprise a single-shot multivibrator. When a positive pulse is extended through capacitor 109 to the base of transistor Q2, the multivibrator is triggered and the collector of transistor Q4 goes positive for approximately 50 milliseconds. The positive pulse, applied to the base of transistor Q5, causes transistors Q5 and Q6 (connected in a Darlington configuration) to conduct. At this time, current flows from terminal 102 through the winding of solenoid 32 and the two transistors to ground. The energization of the solenoid causes the pen to strike the paper to form another dot in the trace and to then drop one-quarter millimeter.

Although the invention has been described with reference to a particular embodiment, it is to be understood that this embodiment is merely illustrative of the application of the principles of the invention. For example, it is possible to keep the lamp on continuously at a low level and to pulse it brighter periodically, with the necessary bias changes being made in the photo-detector circuit; such an arrangement imroves the signal-to-noise ratio. Thus, numerous modifications may be made therein and other arrangements may be devised without departing from the spirit and scope of the invention.

What we claim is:

1. A sedimentation rate test instrument comprising means for holding in a vertical orientation a tube containing a blood sample therein, vertical support means, an assembly mounted for vertical movement on said vertical support means, said assembly including a lamp for transmitting light through said sample tube and means for detecting the light transmitted therethrough, means responsive to the operation of said light detecting means for controlling the falling of said assembly such that said assembly tracks the interface level of the serum and the red cells in said sample tube, the time required for said assembly to move a distance equal to the total distance of interest moved through by said interface level being commensurate with the time required by said interface level to so move, means for moving a strip of paper in the horizontal direction past said assembly, and writing means mounted on said assembly for recording said interface level on said strip of paper.

2. A sedimentation rate test instrument in accordance with claim 1 further including means for controlling said assembly to fall in constant step increments.

3. A sedimentation rate test instrument in accordance with claim 2 further including means for energizing said lamp periodically and wherein said assembly is controlled to fall by a constant step increment each time light from said lamp is transmitted through the serum above the serum-red cell interface level and is detected by said detecting means.

4. A sedimentation rate test instrument in accordance with claim 3 wherein said paper writing means is normally displaced away from said strip of paper and said controlling means is operative to move said writing means to bear against said strip of paper momentarily responsive to each operation of said detecting means.

5. A sedimentation rate test instrument in accordance with claim 3 wherein said fall controlling means includes means for preventing the fall of said assembly under the force of gravity and is operative to allow said assembly to fall under the force of gravity responsive to each operation of said light detecting means.

6. A sedimentation rate test instrument in accordance with claim 1 further including starting means and means responsive to the operation of said starting means for initiating the operation of said paper moving means and the energization of said lamp and for terminating the operation of said paper moving means and the energization of said lamp at the end of a predetermined time interval.

7. A sedimentation rate test instrument in accordance with claim 1 wherein said paper moving means includes a vertical roller for moving said paper therearound and further including starting means and means responsive to the operation of said starting means for causing said roller to make a single rotation in a predetermined time period.

8. A sedimentation rate test instrument in accordance with claim 1 wherein said writing means is normally displaced away from said strip of paper and said fall controlling means is operative to move said writing means to bear against said strip of paper momentarily responsive to each operation of said detecting means.

9. A sedimentation rate test instrument in accordance with claim 1 wherein said assembly further includes shield means for surrounding and shielding said lamp, said light detecting means, and that portion of the sample tube through which said light is transmitted.

10. A sedimentation rate test instrument comprising means for holding in a vertical orientation a tube containing therein a sample to be tested, vertical support means, an assembly mounted for vertical movement on said vertical support means, said assembly including a lamp for transmitting light through said sample tube and means for detecting the light transmitted therethrough, means controlled by said light detecting means for governing the lowering of said assembly such that said assembly tracks the sedimentation level of the sample in said tube, the time required for said assembly to move a distance equal to the total distance of interest moved through by said sedimentation level being commensurate with the time required by said sedimentation level to so move, and means operative with the lowering of said assembly for recording said sedimentation level.

11. A sedimentation rate test instrument in accordance with claim 10 wherein said governing means governs the lowering of said assembly in constant step increments.

12. A sedimentation rate test instrument in accordance with claim 10 wherein said recording means includes means for moving a strip of paper and writing means normally displaced away from said strip of paper, and means for moving said writing means to bear against said strip of paper momentarily each time said assembly is lowered one step increment.

13. A sedimentation rate test instrument in accordance with claim 10 wherein said assembly further includes shield means for surrounding and shielding said lamp, said light detecting means, and that portion of the sample tube through which said light is transmitted.

14. A sedimentation rate test instrument comprising a tube adapted to be held in a vertical orientation and containing therein a sample to be tested, an assembly mounted for vertical movement adjacent to said tube, said assembly including a lamp for transmitting light to said sample tube and means for detecting the light transmitted from said sample tube, means controlled by said light detecting means for governing the lowering of said assembly such that said assembly tracks the sedimentation level of the sample in said tube, the time required for said assembly to move a distance equal to the total distance of interest moved through by said sedimentation level being commensurate with the time required by said sedimentation level to so move, and means operative with the lowering of said assembly for generating a signal indicative of the lowering of said sedimentation level.

15. A sedimentation rate test instrument in accordance with claim 14 wherein said governing means governs the lowering of said assembly in constant step increments.

16. A sedimentation rate test instrument in accordance with claim 15 further including means for changing the state of said lamp periodically.

17. A sedimentation rate test instrument in accordance with claim 16 wherein said signal generating means includes means for moving a strip of paper and writing means normally displaced away from said strip of paper, and means for moving said writing means to bear against said strip of paper momentarily each time said assembly is lowered one step increment.

18. A sedimentation rate test instrument in accordance with claim 16 wherein said governing means includes means for preventing the fall of said assembly under the force of gravity and is operative to allow said assembly to fall under the force of gravity each time said assembly is required to be lowered.

19. A sedimentation rate test instrument in accordance with claim 14 further including starting means and means responsive to the operation of said starting means for initiating the operation of said signal generating means and the energization of said lamp and for terminating the operation of said signal generating means and the energization of said lamp at the end of a predetermined time interval.

20. A sedimentation rate test instrument in accordance with claim 19 wherein said signal generating means includes roller means mounted in the vertical direction for transporting paper therearound and means for writing on said paper, and said starting means includes a button mounted for downward movement on top of said roller means.

21. A sedimentation rate test instrument in accordance with claim 20 wherein said button includes indicia of time around the periphery thereof and is mounted for rotation with said roller means and for manual rotation, and further including means for limiting the manual turning of said button at a predetermined position such that said indicia of time will be placed in a predetermined orientation prior to the operation of said starting means.

22. A sedimentation rate test instrument in accordance with claim 14 wherein said signal generating means includes a vertical roller for moving paper therearound and means for writing on said paper, and further including starting means and means responsive to the operation of said starting means for causing said roller to make a single rotation in a predetermined time period.

23. A sedimentation rate test instrument in accordance with claim 22 further including means for periodically energizing said lamp, and means responsive to the initial operation of said starting means for controlling the periodic energization of said lamp only during the time period that said roller rotates.

24. A sedimentation rate test instrument in accordance with claim 22 further including means for energizing said lamp periodically and wherein said assembly is governed to be lowered by a constant step increment each time light from said tube is detected by said detecting means.

25. A sedimentation rate test instrument in accordance with claim 14 wherein said assembly further includes shield means for surrounding and shielding said lamp, said light detecting means, and that portion of the sample tube through which said light is transmitted.

* * * * *